United States Patent [19]
Reinhold

[11] 3,929,576
[45] Dec. 30, 1975

[54] PRODUCING 3-FLUORO-D-ALANINE

[75] Inventor: Donald F. Reinhold, North Plainfield, N.J.

[73] Assignee: Merck & Co., Inc., Rahway, N.J.

[22] Filed: Nov. 20, 1974

[21] Appl. No.: 525,591

Related U.S. Application Data

[62] Division of Ser. No. 223,355, Feb. 3, 1972, abandoned.

[52] U.S. Cl. .................. 195/30; 195/29; 195/47
[51] Int. Cl.² ........................................ C12D 13/06
[58] Field of Search .............. 195/29, 96, 47, 30

[56] References Cited
UNITED STATES PATENTS

| | | | |
|---|---|---|---|
| 2,749,279 | 6/1956 | Smythe et al. | 195/30 |
| 3,183,170 | 5/1965 | Kitai et al. | 195/30 |

OTHER PUBLICATIONS

Chemical Abstracts, Vol. 79, 115888u; 1973.

*Primary Examiner*—Lionel M. Shapiro
*Assistant Examiner*—Robert J. Warden
*Attorney, Agent, or Firm*—Henry H. Bassford, Jr.; J. Jerome Behan

[57] ABSTRACT

3-Fluoro-D-alanine and its deutero analogs, which are potent antibacterial agents, are prepared from fluoropyruvic acid by asymmetric synthesis using an optically active amine such as D-α-methylbenzylamine.

2 Claims, No Drawings

PRODUCING 3-FLUORO-D-ALANINE

This is a division of Ser. No. 223,355, filed Feb. 3, 1972, and now abandoned.

This invention is concerned generally with the production of 3-fluoro-D-alanine and its deutero analogs, which are potent antibacterial agents valuable in inhibiting the growth of pathogenic bacteria of both the gram-positive and gram-negative type. More particularly, it relates to the preparation of 3-fluoro-D-alanine compounds by asymmetric synthesis wherein fluoropyruvic acid is reacted with a D-optically active amine such as D-α-methylbenzyl-amine to form the corresponding ketimine which is catalytically hydrogenated or deuterated to form an N-(D-α-methylbenzyl) derivative, followed by hydrogenolysis of the methylbenzyl group to form 3-fluoro-D-alanine or 2-deutero-3-fluoro-D-alanine. Alternatively, an amino group of a D-amino acid is enzymatically transferred to the fluoropyruvic acid.

In accordance with the present invention a D-optically active amine compound, such as D-α-methylbenzylamine, R(D)-phenylglycine, 1-amino-(S)-2-[(R)-1-hydroxyethyl]indoline and the like, are reacted with fluoropyruvic acid, preferably in solution in a lower alkanol such as ethanol. The reaction is initially conducted in the cold, and is allowed to warm to about room temperature under which conditions the reaction is substantially complete in 1 hour. The resulting ketimine such as 2-(D-α-methylbenzylimino)-3-fluoropropionic acid, 2-(D-α-carboxybenzylimino)-3-fluoropropionic acid, and the like is then reacted with hydrogen under pressure, preferably at about 40 psi in the presence of a hydrogenation catalyst such as palladium on carbon catalyst; the hydrogenation is continued until uptake ceases, the catalyst is removed by filtration, and the hydrogenation product is recovered from the filtrate if desired to give N-(D-α-methylbenzyl)-3-fluoro-D-alanine, N-(D-α-carboxybenzyl)-3-fluoro-D-alanine, and the like.

A solution of this N-substituted derivative in aqueous ethanol is then reacted with hydrogen at elevated pressure, e.g., 40 psi, using a hydrogenation catalyst such as palladium hydroxide-on-charcoal catalyst, thereby hydrogenolyzing the N-substituent. After hydrogen uptake ceases, the catalyst is filtered, the filtrate is evaporated to dryness in vacuo, and the residual material is recrystallized from aqueous isopropanol to give 3-fluoro-D-alanine.

The following examples illustrate methods of carrying out the present invention, but it is to be understood that these examples are given for purposes of illustration and not of limitation.

EXAMPLE 1

A cold solution of 12.1 g of D-α-methylbenzylamine in 100 ml of ethanol is slowly added to a solution of 5.3 g of fluoropyruvic acid in 250 ml of ethanol, while maintaining the resulting solution at 0°C. The solution is allowed to warm to 25°C. and kept at 25°C. for 1 hour. The solution containing 2-(D-α-methylbenzylimino)-3-fluoro-propionic acid is then reacted with hydrogen at 40 psi using 5.0 g of 10% palladium-on-carbon catalyst, the hydrogenation being continued until uptake ceases; the catalyst is removed by filtration, and the filtrate is evaporated to half-volume. About 100 ml of water is added to form an aqueous ethanolic solution containing the N-(D-α-methylbenzyl)-3-fluoro-D-alanine, and the methylbenzyl group is hydrogenolyzed at 40 psi using 5.0 g of 10% palladium hydroxide-on-charcoal catalyst. After hydrogen uptake ceases, the catalyst is removed by filtration, the filtrate is evaporated to dryness in vacuo, and the residual material is recrystallized from 50% isopropanol-water, and then from water, to yield substantially pure 3-fluoro-D-alanine.

EXAMPLE 2

A cold solution of 12.1 g of D-α-methylbenzylamine in 100 ml of ethanol is slowly added to a solution of 5.3 g of fluoropyruvic acid in 250 ml of ethanol, while maintaining the resulting solution at 0°C. The solution is allowed to warm to 25°C. and kept at 25°C. for 1 hour. The solution containing 2-(D-α-methyl-benzylimino)-3-fluoro-propionic acid is then reacted with deuterium at 40 psi using 5.0 g of 10% palladium-on-carbon catalyst, the deuteration being continued until uptake ceases; the catalyst is removed by filtration, and the filtrate is evaporated to half volume. About 100 ml. of water is added to form an aqueous ethanolic solution containing the N-(D-α-methyl-benzyl)-2-deutero-3-fluoro-D-alanine, and the methylbenzyl group is hydrogenolyzed utilizing palladium hydroxide-on-charcoal catalyst. After hydrogen uptake ceases, the catalyst is removed by filtration, the filtrate is evaporated to dryness in vacuo, and the residual material is recrystallized from 50% isopropanol-water, and then from water, to yield substantially pure 2-deutero-3-fluoro-D-alanine.

Instead of using D-α-methylbenzylamine in the reaction with fluoropyruvic acid, other optically active amino compounds may also be employed such as R(D)-phenylglycine or 1-amino-(S)-2-[(R)-1-hydroxyethyl]indoline or alternatively, an amino group may be transferred enzymatically, using a D-amino acid oxidase or a D-amino acid specific transaminase, to the fluoropyruvic acid from a D-amino acid such as D-alanine, D-2-aminobutyrate, D-proline, D-phenylalanine, D-methionine, either in their optically pure form, or in admixture with their L-counterpart. For example, 150 μg/ml of crystalline hog kidney D-amino acid oxidase are added to a solution containing 0.1 M sodium pyrophosphate buffer, pH 8.5, 40 mM ammonium sulfate, 40 mM sodium 3-fluoro-pyruvate and 8 mM D-proline, and the system is flushed with nitrogen to exclude all oxygen. The mixture is incubated at 25°C. for 4 hours, and the enzyme is inactivated by heating at 95° C. for 2 minutes. The reaction solution is diluted with isopropanol and adjusted to 4.8 by addition of aqueous ammonia; the precipitated material is recovered by filtration and dried to give 3-fluoro-D-alanine.

Various changes and modifications may be made in carrying out the present invention without departing from the spirit and scope thereof. Insofar as these changes and modifications are within the purview of the annexed claims, they are to be considered as part of this invention.

What is claimed is:
1. The process which comprises enzymatically transferring an amino group of a D-amino acid for the keto group of fluoropyruvic acid thereby forming the corresponding 3-fluoro-D-alanine.
2. The process as defined in claim 1, wherein the enzyme utilized is a D-amino acid oxidase, and the D-amino acid employed is D-proline.

* * * * *